United States Patent
Lin et al.

(10) Patent No.: US 8,801,221 B2
(45) Date of Patent: Aug. 12, 2014

(54) LENS STRUCTURE, LIGHT SOURCE DEVICE AND LIGHT SOURCE MODULE

(71) Applicants: Meng-Hsuan Lin, Hsin-Chu (TW);
Chien-Chung Liao, Hsin-Chu (TW);
Chun-Wei Lee, Hsinc-Chu (TW)

(72) Inventors: Meng-Hsuan Lin, Hsin-Chu (TW);
Chien-Chung Liao, Hsin-Chu (TW);
Chun-Wei Lee, Hsinc-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 41 days.

(21) Appl. No.: 13/733,894

(22) Filed: Jan. 4, 2013

(65) Prior Publication Data
US 2013/0176729 A1    Jul. 11, 2013

(30) Foreign Application Priority Data
Jan. 6, 2012    (CN) .......................... 2012 1 0002847

(51) Int. Cl.
*F21V 5/00*    (2006.01)

(52) U.S. Cl.
USPC ............ 362/245; 362/335; 362/326; 362/327

(58) Field of Classification Search
USPC ................................................. 362/326, 334
See application file for complete search history.

(56) References Cited

U.S. PATENT DOCUMENTS

| | | | |
|---|---|---|---|
| 5,757,557 A | 5/1998 | Medvedev et al. | |
| 7,637,630 B2 | 12/2009 | Wilcox et al. | |
| 7,674,018 B2 | 3/2010 | Holder et al. | |
| 7,854,536 B2 | 12/2010 | Holder et al. | |
| 7,891,835 B2 | 2/2011 | Wilcox | |
| 8,104,930 B2 * | 1/2012 | Zhang et al. | 362/311.02 |
| 8,633,641 B2 * | 1/2014 | Lin | 313/327 |

FOREIGN PATENT DOCUMENTS

| | | |
|---|---|---|
| TW | 201032359 | 9/2010 |
| TW | 201105902 | 2/2011 |

* cited by examiner

*Primary Examiner* — Evan Dzierzynski
(74) *Attorney, Agent, or Firm* — Jianq Chyun IP Office

(57) ABSTRACT

A lens structure, a light source device, and a light source module are provided. The light source device includes a light emitting device and a lens structure. The light emitting device is capable of emitting a light beam. The lens structure includes a first surface, a second surface opposite to the first surface and four total internal reflection surfaces connected to the second surface. Some of the total internal reflection surfaces connect to the first surface. The first surface has a recess. The light emitting device is disposed at the recess. The second surface is a free-form surface. The light beam is capable of entering the lens structure through the first surface, and leaving the lens structure through the second surface.

29 Claims, 8 Drawing Sheets

LENS STRUCTURE, LIGHT SOURCE DEVICE AND LIGHT SOURCE MODULE

CROSS-REFERENCE TO RELATED APPLICATION

This application claims the priority benefit of China application serial no. 201210002847.4, filed on Jan. 6, 2012. The entirety of the above-mentioned patent application is hereby incorporated by reference herein and made a part of this specification.

BACKGROUND OF THE INVENTION

1. Field of the Invention

The invention relates to a lens structure, a light source device, and a light source module. Particularly, the invention relates to a lens structure, having a free-form surface and total internal reflection surfaces, a light source device, and a light source module using the same.

2. Description of Related Art

A total internal reflection (TIR) collimator lens is generally used in a lighting system to collect a light beam from a light source, so as to achieve a specific irradiation angle and improve uniformity of the projected light. Generally, the TIR collimator lens includes an upper surface, a lower surface, and a TIR cup surface connected to the upper surface and the lower surface. Regarding a light beam that forms a larger included angle with an optical axis of the light source, it is refracted to the TIR cup surface by the lower surface, then reflected to the upper surface by the TIR cup surface, and leaving the TIR collimator lens through the upper surface. Regarding a light beam that forms a smaller included angle with the optical axis of the light source, it is directly refracted to the upper surface by the lower surface, and leaving the TIR collimator lens through the upper surface. The TIR collimator lens could effectively concentrate the light beam and reduce a light emitting angle of the light beam, so that the light beam could be effectively transmitted to a desired object.

However, in an existing TIR collimator lens, the upper surface, the lower surface, and the TIR cup surface are generally rotationally symmetric to the optical axis of the light source, so that a shape of the light projected by the existing TIR collimator lens is generally a rotationally symmetric pattern, for example, a circle, etc. In this way, if a region to be lighted is a rectangular region, for example, an advertising billboard, the existing TIR collimator lens has following shortages. FIG. 1A illustrates a situation that a light beam passing through the existing TIR collimator lens is projected on a rectangular target object. Referring to FIG. 1A, a light spot 10 is formed when the light beam passes through the existing TIR collimator lens and projects on a rectangular target object 200, and the light spot 10 is not easy to cover four corners of the target object 200, so that uniformity of the light beam projected on the rectangular target object 200 is poor. FIG. 1B illustrates a situation that a light beam passes through another existing TIR collimator lens and projects on a rectangular target object. Referring to FIG. 1B, considering the uniformity, the light spot covers the four corners of the target object 200, though a part of the light beam overflows from four sides (i.e. regions Z) of the target object 200, which may cause poor efficiency of the light beam in lighting the target object 200. FIG. 2 illustrates a situation that a light beam passes through the existing TIR collimator lens and projects on a rectangular target object. Referring to FIG. 2, in an application of lighting a billboard, a light source is generally disposed at a lower edge of the rectangular target object 200, and the TIR collimator lens 30 has to be tilted by a certain angle in order to light the whole rectangular target object 200. Since illuminance per unit area is inversely proportional to a square of a distance between the light source, illuminance on a region a that locates further from the light source 30 is far smaller than illuminance on a region b that locates closer to the light source 30, so that the uniformity of the light beam projected on the rectangular target object 200 is poor. Moreover, a part of the light beam overflows from an upper edge B of the rectangular target object 200, which decreases the efficiency of the light beam in lighting the target object 200.

Moreover, devices or components related to a light source system are also provided. For example, Taiwan Patent Publication No. 201105902 discloses a reflector, and a part of the reflector surrounds a light emitting diode (LED) module, and light usage efficiency of the LED module is increased through the reflector. Moreover, Taiwan Patent Publication No. 201032359 discloses a lens having a light incident surface, a light emitting surface, a first side surface, and a second side surface. U.S. Pat. No. 7,891,835 discloses a shielding device having a reflection surface for guiding a light beam to a predetermined side. U.S. Pat. No. 7,854,536 discloses an apparatus including LEDs and an optical device, where a reflector is configured between the LEDs and the optical device. U.S. Pat. No. 7,637,630 discloses a shielding device, which guides a light beam emitted from a LED device. U.S. Pat. No. 7,674,018 discloses a lens, where a light beam emitted from an LED is incident through one region of the lens and exits from another region of the lens. U.S. Pat. No. 5,757,557 discloses a lens having a front surface and a side surface, and a light beam emitted from a light source is reflected by the side surface to emit via the front surface.

SUMMARY OF THE INVENTION

The invention is directed to a lens structure, which provides a uniform light intensity.

The invention is directed to a light source device, which provides a good illumination effect.

The invention is directed to a light source module, which provides a good illumination effect.

Additional aspects and advantages of the invention will be set forth in the description of the techniques disclosed in the invention.

To achieve one of or all aforementioned and other advantages, an embodiment of the invention provides a lens structure. The lens structure is capable of guiding a light beam. The lens structure includes a first surface having a recess, a second surface opposite to the first surface and being as a free-form surface, and four total internal reflection (TIR) surfaces connected to the second surface. Some of the total internal reflection surfaces connected to the first surface. The light beam is capable of entering the lens structure through the first surface and leaving the lens structure through the second surface.

Another embodiment of the invention provides a light source device including the aforementioned lens structure and a light emitting device. The light emitting device is disposed at the recess.

Another embodiment of the invention provides a light source module, which includes a plurality of first light source devices. The first light source devices are arranged like an array, and each of the first light source devices includes a first light emitting device and a first lens structure. The first light emitting device is capable of emitting a first light beam. The first lens structure includes a first surface, a second surface, and four TIR surfaces. The first surface has a first recess. The first light emitting device is disposed at the first recess. The second surface is opposite to the first surface, and the second surface is a free-form surface. The first light beam is capable of entering the first lens structure through the first surface, and leaving the first lens structure through the second surface. The four TIR surfaces connect to the second surface. Some of the total internal reflection surfaces connect to the first surface The embodiment of the invention has at least one of the following advantages or effect. In the embodiment of the invention, by designing the second surface of the lens structure to be a free-form surface and in collaboration with a design of four or more than four TIR surfaces, a light distribution shape and a light intensity distribution of the light source device and the light source module are adjusted, so as to provide a good illumination effect.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
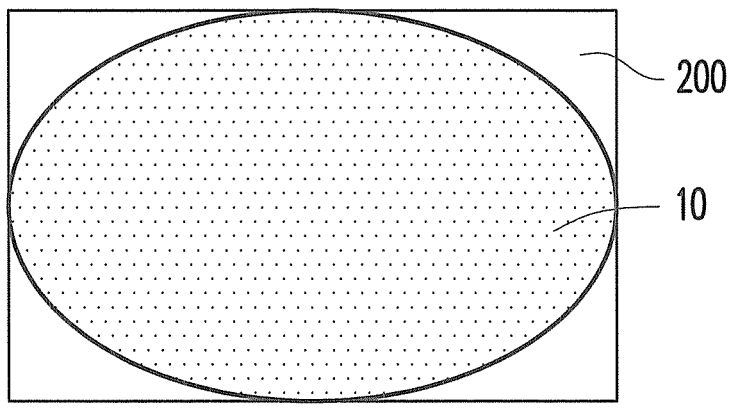
FIG. 1A, FIG. 1B and FIG. 2 illustrate a situation that a light beam passes through the existing total internal reflection (TIR) collimator lens projects on a rectangular target object.
Figure 1B:
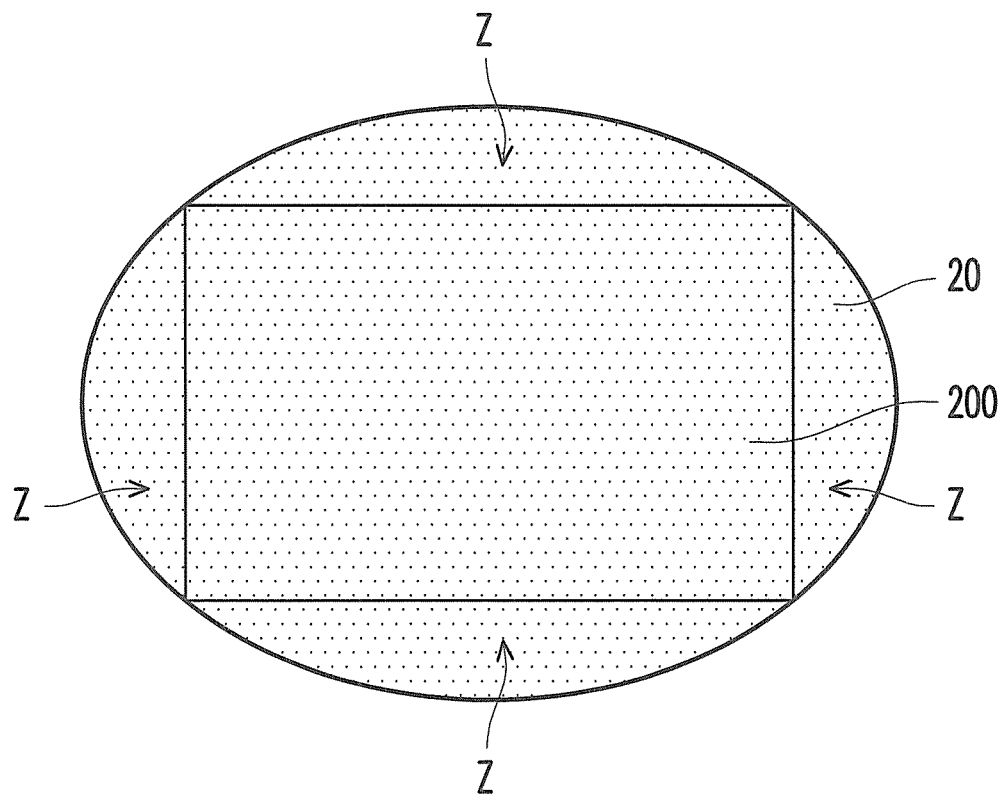
Figure 2:
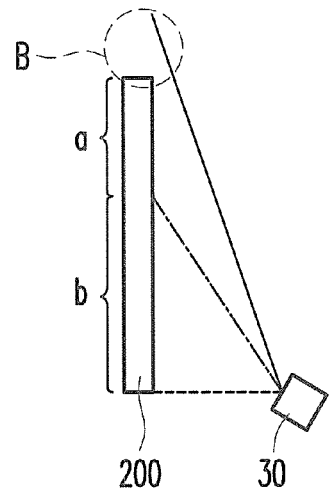
Figure 3:
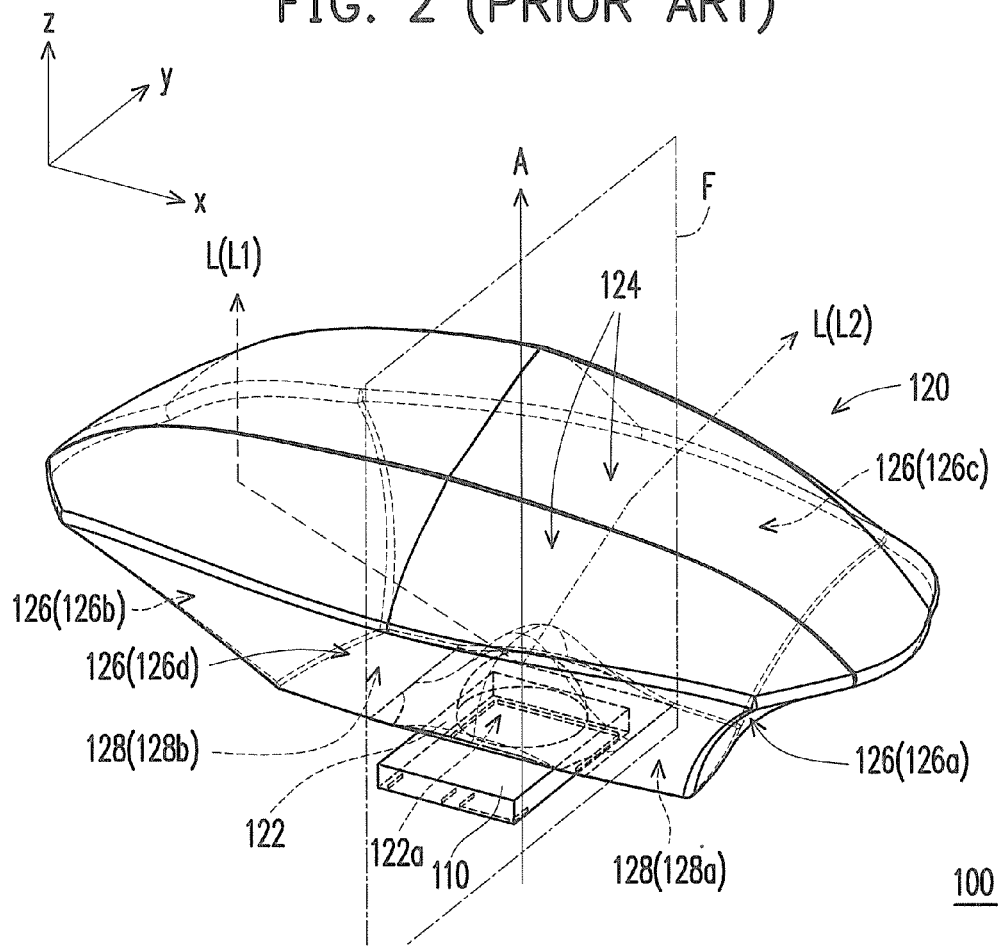
FIG. 3 is a perspective view of a light source device according to an embodiment of the invention.
Figure 4:
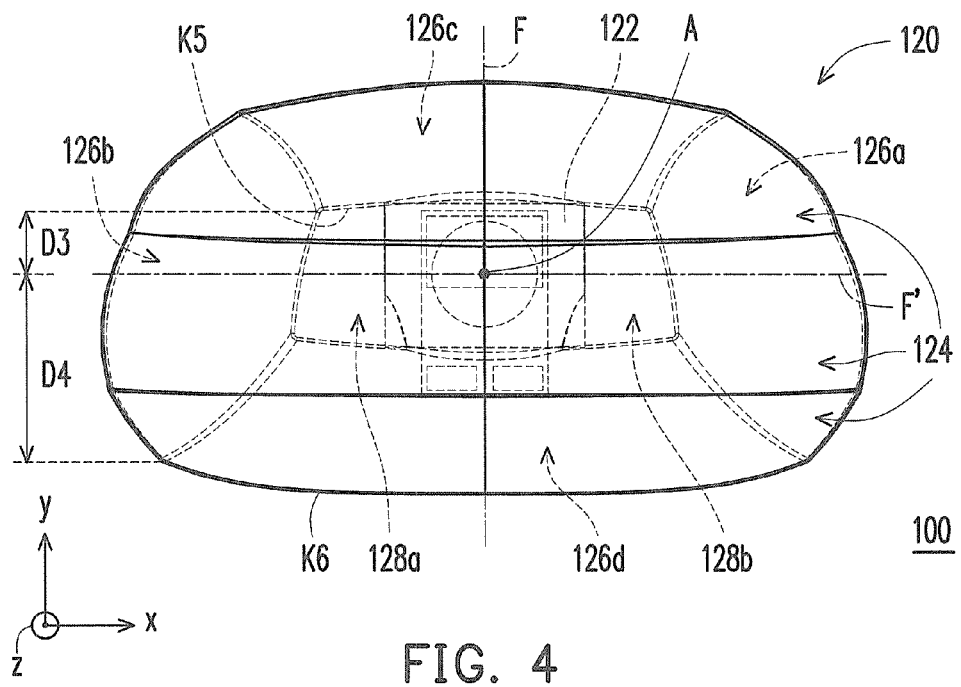
FIG. 4 is a top view of the light source device of FIG. 3.
Figure 5:
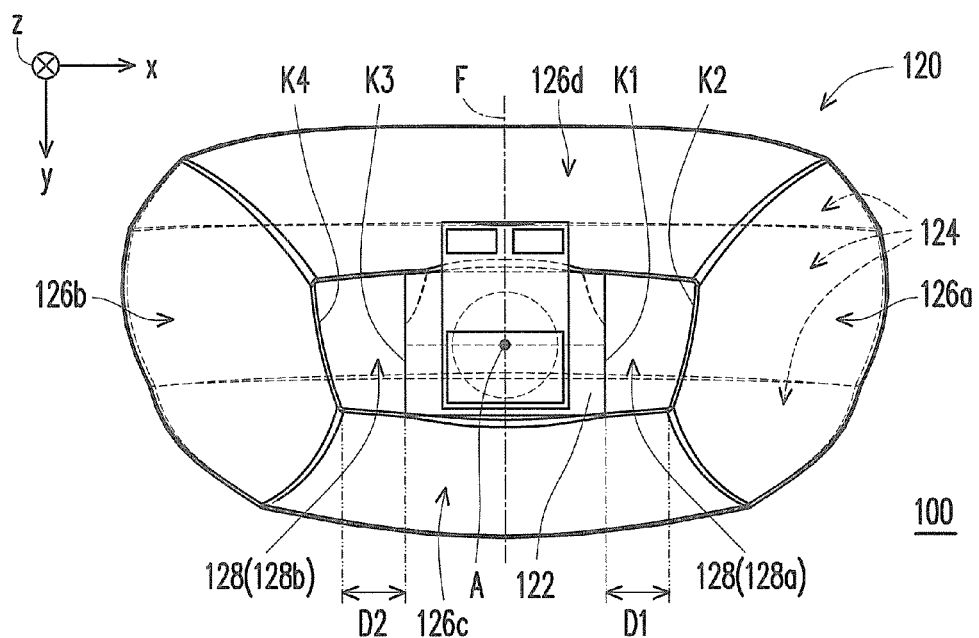
FIG. 5 is a bottom view of the light source device of FIG. 3.
Figure 6:
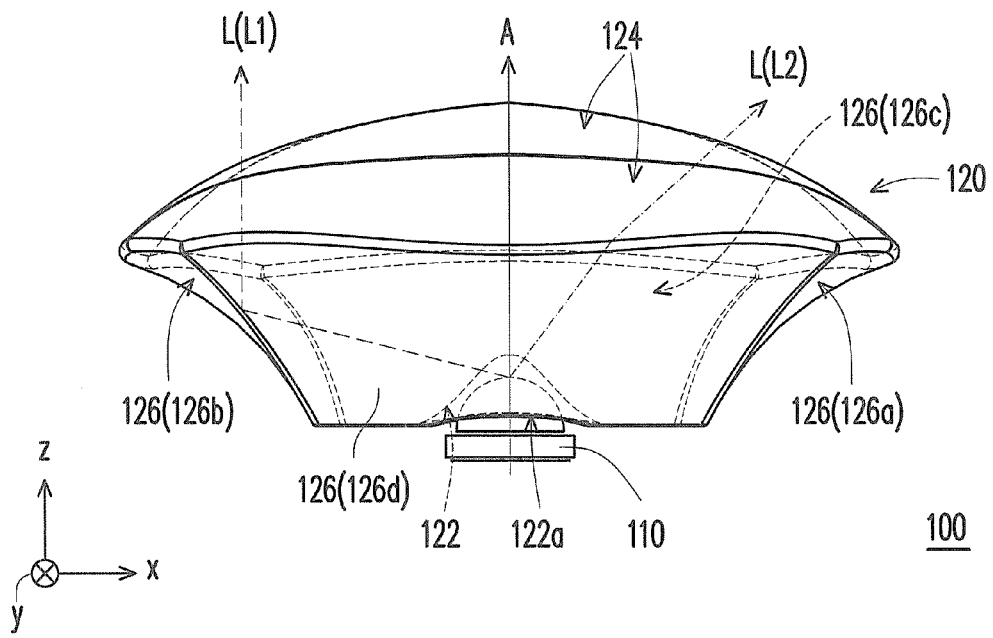
FIG. 6 is a front view of the light source device of FIG. 3.
Figure 7:
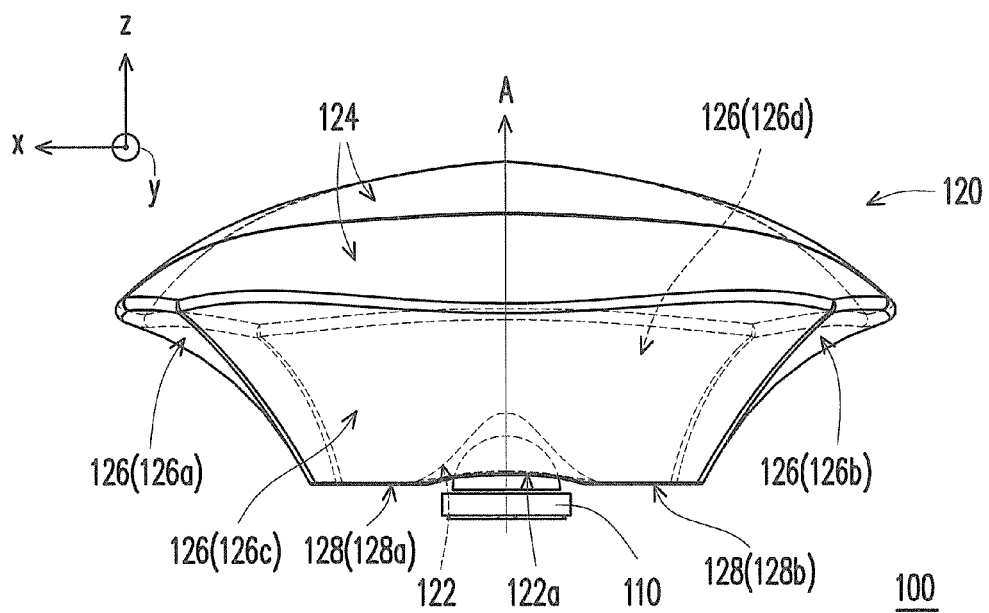
FIG. 7 is a back view of the light source device of FIG. 3.
Figure 8:
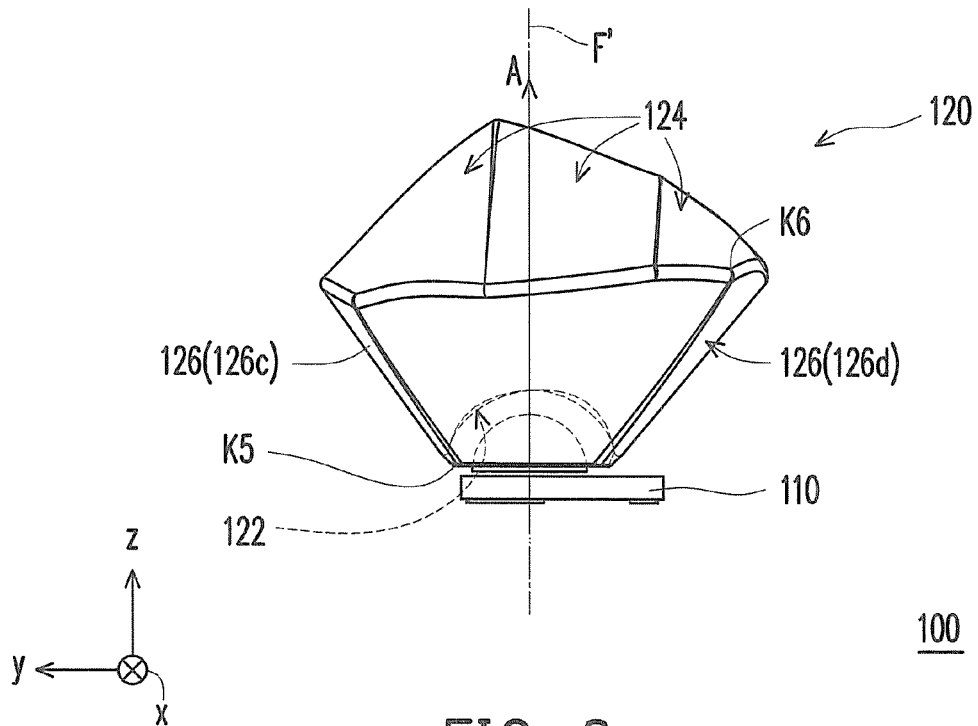
FIG. 8 is a left view of the light source device of FIG. 3.
Figure 9:
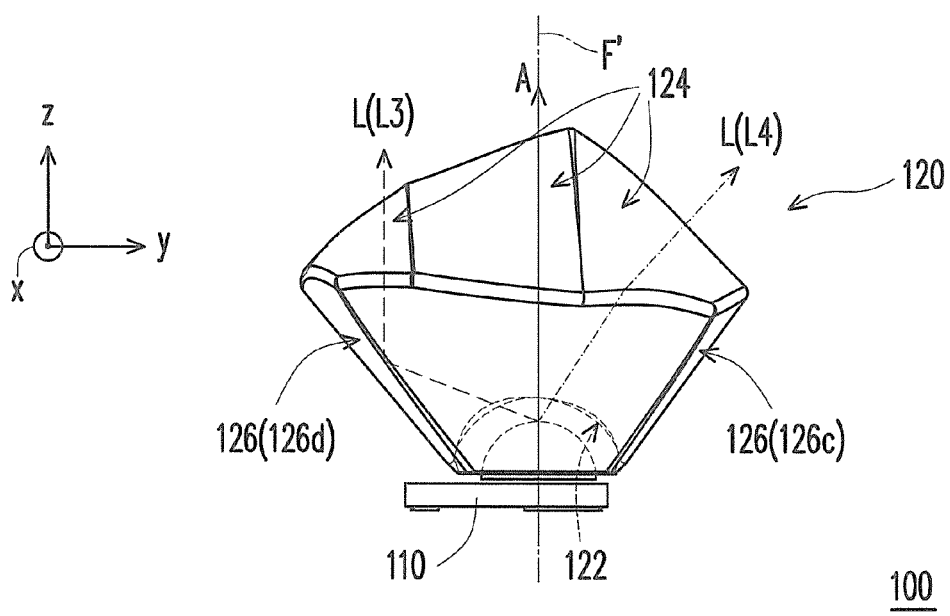
FIG. 9 is a right view of the light source device of FIG. 3.

FIG. 3 is a perspective view of a light source device according to an embodiment of the invention. FIG. 4 is a top view of the light source device of FIG. 3. FIG. 5 is a bottom view of the light source device of FIG. 3. FIG. 6 is a front view of the light source device of FIG. 3. FIG. 7 is a back view of the light source device of FIG. 3. FIG. 8 is a left view of the light source device of FIG. 3. FIG. 9 is a right view of the light source device of FIG. 3. Referring to FIG. 3 and FIG. 6, the light source device 100 of the embodiment includes a light-emitting device 110 and a lens structure 120. The light-emitting device 110 of the embodiment is suitable to emit a light beam L. In the embodiment, the light-emitting device 110 is, for example, a light-emitting diode (LED), though the invention is not limited thereto, and in other embodiments, the light-emitting device 110 could also be other suitable light sources.

Referring to FIG. 3 and FIG. 6, the lens structure 120 of the embodiment includes a first surface 122, a second surface 124 opposite to the first surface 122, and a plurality of total internal reflection (TIR) surfaces 126 connected to the second surface 124. Some of the TIR surfaces 126 connect to the first surface 122. The number of the TIR surfaces 126 could be four or more than four. The first surface 122 of the embodiment has a recess 122a. In the embodiment, the light-emitting device 110 is disposed at the recess 122a of the first surface 122. The light beam L emitted from the light-emitting device 110 is capable of entering the lens structure 120 through the first surface 122, and leaving the lens structure 120 through the second surface 124. In other words, in the embodiment, the first surface 122 is, for example, a light incident surface, and the second surface 124 is, for example, a light emitting surface.

It should be noticed that in the embodiment, the second surface 124 is a free-form surface. A light intensity distribution of the light source device 100 along various directions could be adjusted by designing a shape of the second surface 124, so as to mitigate the problem of uneven illuminance of the existing technique.

For example, as shown in FIG. 6 and FIG. 9, light beams L2 and L4 that form a smaller included angle with an optical axis A of the light-emitting device 110 may sequentially pass through the first surface 122 and the second surface 124, and by adjusting the shape of the second surface 124, transmission directions of the light beams L2 and L4 and light intensity distributions thereof could be controlled, so as to mitigate the problem of uneven illuminance. On the other hand, light beams L1 and L3 that form a larger included angle with the optical axis A of the light-emitting device 110 are first refracted to the TIR surface 126 by the first surface 122, and then are reflected to the second surface 124. Similarly, by adjusting the shapes and a configuration of the second surface 124 and the TIR surface 126, transmission directions of the light beams L1 and L3 and light intensity distributions thereof could be controlled, so as to mitigate the problem of uneven illuminance. Moreover, the first surface 122 of the embodiment could also optionally be a free-form surface, so as to strengthen capability for the light source device 100 adjusting the light intensity distribution, and achieve a better effect of ameliorating the problem of uneven illuminance.

Figure 10A:
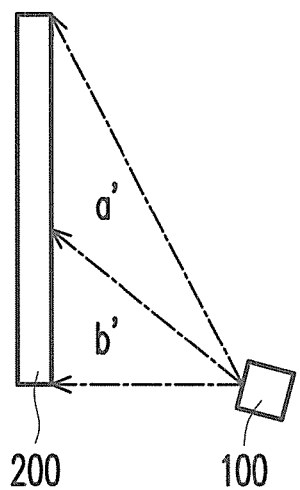
FIG. 10A illustrates a situation that a light source device according to an embodiment of the invention lights a target object.
Figure 10B:
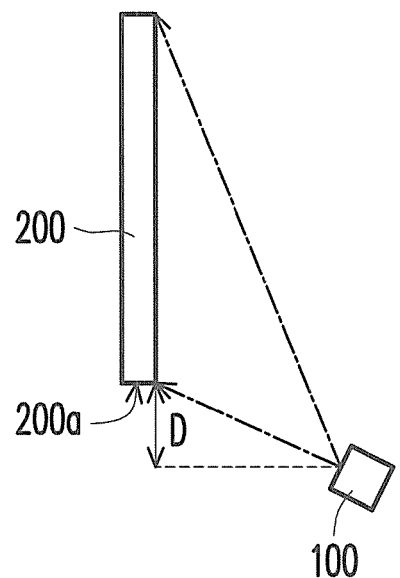
FIG. 10B illustrates a situation that a light source device according to an embodiment of the invention and a bottom surface of a target object are not coplanar.

FIG. 10A illustrates a situation that the light source device 100 lights a target object 200. Referring to FIG. 10A, by designing the second surface 124 of the light source device 100 of the embodiment, a light intensity on a region a' that locates averagely further from the light source device 100 is greater than a light intensity on a region b' that locates averagely closer to the light source device 100, so that illuminances of the regions a' and b' could be the same, so as to mitigate the problem of uneven illuminance caused by optical path difference in the existing technique. FIG. 10B illustrates a situation that the light source device 100 and a bottom surface 200a of the target object 200 are not coplanar. Referring to FIG. 10B, when the light source device 100 and the bottom surface 200a of the target object 200 are not coplanar, for example, considering maintenance convenience, a shift amount D is maintained between the light source device 100 and the bottom surface 200a of the target object 200 along a vertical direction. In this case, the light source device 100 could also adjust the light intensity distribution along various directions by designing the second surface 124, so as to match a configuration position and a size of the target object 200. In this way, the light source device 100 could project a light with good uniformity on the target object 200.

Referring to FIG. 3 and FIG. 7, the first surface 122 of the embodiment is a concave surface, and the concave surface pits towards the second surface 124. The second surface 124 of the embodiment is a convex surface, and the convex surface swells along a direction from the first surface 122 to the second surface 124. The TIR surfaces 126 of the embodiment could form a taper towards the first surface 122. Moreover, the lens structure 120 of the embodiment further includes a bottom surface 128. The bottom surface 128 is opposite to the second surface 124 and is connected to the TIR surfaces 126 and the first surface 122. In detail, the bottom surface 128 of the embodiment includes a surface 128a and a surface 128b respectively located at two opposite sides of the first surface 122, where the surface 128a is connected to the first surface 122 and the TIR surface 126a, and the surface 128b is connected to the first surface 122 and the TIR surface 126b.

Referring to FIG. 3 and FIG. 5, the lens structure 120 of the embodiment has a reference plane F, where the optical axis A is located on the reference plane F. In detail, if the bottom surface 128 is located on an xy plane, the reference plane F could be a plane on which the optical axis A of the light-emitting device 110 locates and is a plane parallel to a yz plane. The lens structure 120 of the embodiment includes four TIR surfaces 126. As shown in FIG. 5, the four TIR surfaces 126 include the first TIR surface 126a and the second TIR surface 126b. In the embodiment, the first TIR surface 126a could be symmetric to the second TIR surface 126b about the reference plane F. In other words, the first TIR surface 126a and the second TIR surface 126b are mirror-symmetric about the reference plane F. Further, as shown in FIG. 5, a shortest distance D1 between a join K1 of the surface 128a and the first surface 122 and a join K2 of the surface 128a and the first TIR surface 126a could be equal to a shortest distance D2 between a join K3 of the surface 128b and the first surface 122 and a join K4 of the surface 128b and the second TIR surface 126b.

Moreover, as shown in FIG. 4, the lens structure 120 of the embodiment further includes a third TIR surface 126c and a fourth TIR surface 126d. The third TIR surface 126c is connected to the first TIR surface 126a and the second TIR surface 126b. The fourth TIR surface 126d is opposite to the third TIR surface 126c, and is connected to the first TIR surface 126a and the second TIR surface 126b. In the embodiment, the third TIR surface 126c is not symmetric to the fourth TIR surface 126d about a reference plane F', where the reference plane F' is a plane on which the optical axis A of the light-emitting device 110 locates and is a plane parallel to an xz plane.

In other words, as shown in FIG. 4 and FIG. 8, in the embodiment, a shortest distance D3 between the optical axis A of the light-emitting device 110 and a join K5 of the first surface 122 and the third TIR surface 126c could be different to a shortest distance D4 between the optical axis A of the light-emitting device 110 and a join K6 of the second surface 124 and the fourth TIR surface 126d. In the embodiment, the distance D4 is greater than the distance D3. In other words, the lens structure 120 could be gradually expanded towards a direction away from the light-emitting device 110, so as to increase a light-emitting area.

It should be noticed that by adjusting distances (for example, the distances D3 and D4) between the light-emitting device 110 and the TIR surfaces 126, the light intensity distribution of the light source device 100 along various directions could be adjusted, and in collaboration with a configuration position of the target object, the light projected on the target object by the light source device 100 is even.

Moreover, the TIR surface 126 of FIG. 3 collects the light beams with larger light-emitting angles to reflect to the second surface 124 to increase the light usage efficiency of the light source device 100, and the TIR surfaces 126a, 126b, 126c and 126d arranged in a quadrilateral could also adjust a shape of the light emitted by the light-emitting device 110 into a rectangle, so as to match an appearance of a general target object (for example, a billboard), and increase uniformity and illumination efficiency of the light projected on the target object 200 by the light source device 100 of the embodiment.

In the embodiment, at least one of the TIR surfaces 126 that surround the first surface 122 could be one of a free-form surface, a spherical surface, an aspherical surface and a biconic surface. The TIR surface 126 of the biconic surface could effectively control an aspect ratio of the light beam with a larger light-emitting angle along an x-direction and a y-direction. By adjusting curvatures of the biconic surface along the x-direction and the y-direction, the light shape of the light source device 100 could be further adjusted, so as to increase uniformity and illumination efficiency of the light projected on the target object by the light source device 100 of the embodiment.

Figure 11:
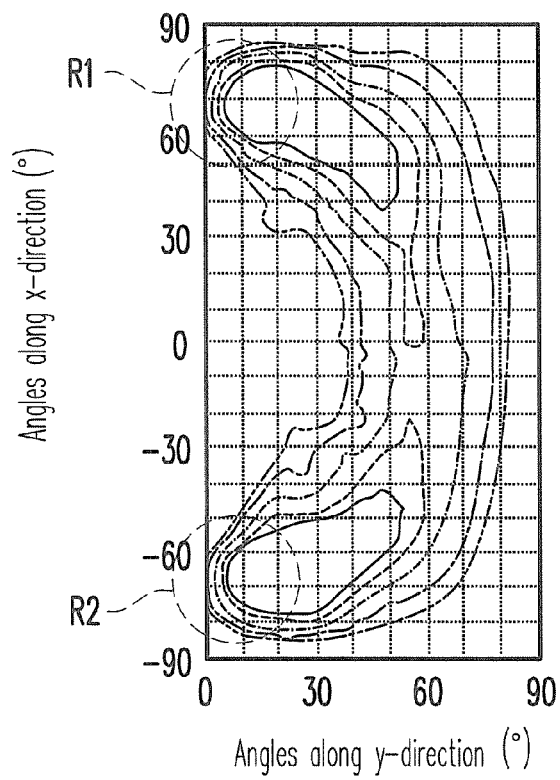
FIG. 11 is an isocandela plot of a light source device according to an embodiment of the invention.

FIG. 11 is an isocandela plot of the light source device 100 of the embodiment. A horizontal axis in FIG. 11 represents various angles along the y-direction, and a vertical axis represents various angles along the x-direction. Referring to FIG.

Figure 12:
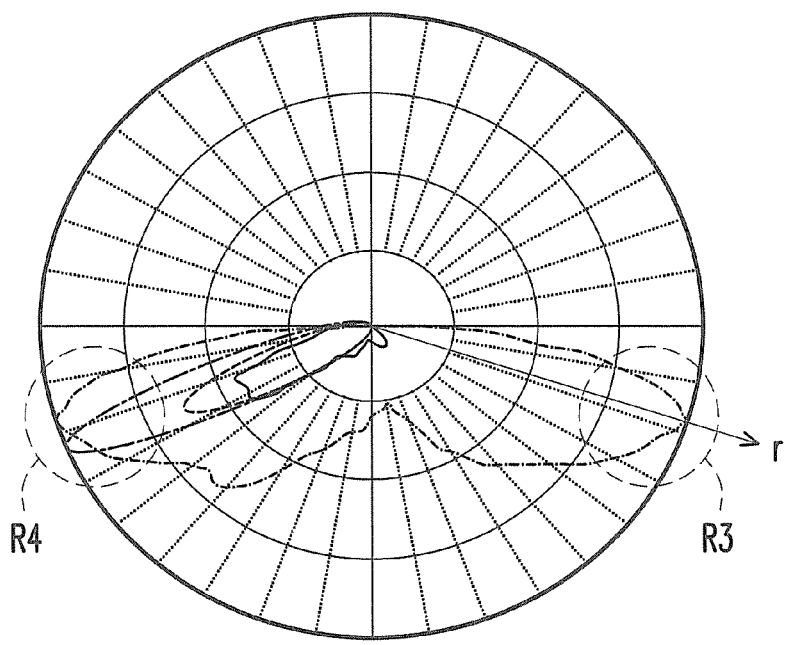
FIG. 12 is a polar candela distribution plot of a light source device according to an embodiment of the invention.

11, the light shape of the light source device 100 of the embodiment is close to a rectangle, and two corners R1 and R2 thereof respectively have a high light intensity. In other words, the light source device 100 of the embodiment could effectively mitigate the problem of uneven illuminance, especially a problem that four corners of a rectangular object could not be lighted. FIG. 12 is a polar candela distribution plot of the light source device 100 of the embodiment. Magnitudes along a radial direction r of FIG. 12 represent magnitudes of the light intensity of the light source device 100 along various directions. According to FIG. 12, it is known that the light intensities of the light source device 100 at corners R3 and R4 are also increased. In other words, the light source device 100 of the embodiment could effectively mitigate the problem of excessively low illuminances at the corners of the existing technique.

Figure 13:
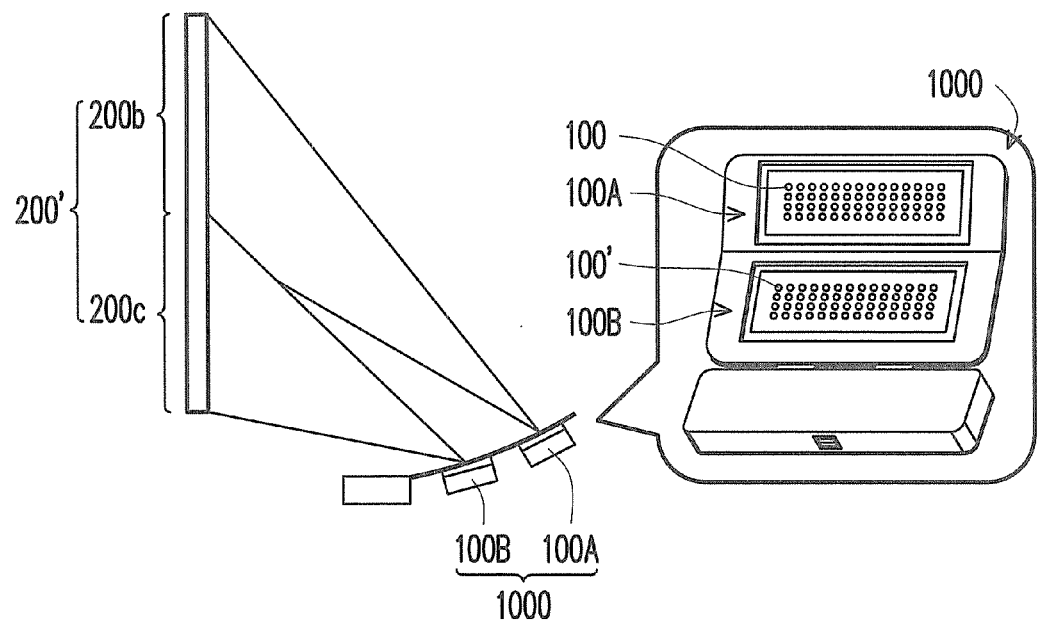
FIG. 13 illustrates a light source module and a situation that the light source module lights a target object according to an embodiment of the invention

Besides the application of a single light source device 100, a plurality of light source devices 100 could be combined to form a light source module to light a target object of a larger area. For example, a right side of FIG. 13 illustrates a light source module 1000 according to an embodiment of the invention, and a left side of FIG. 13 illustrates a situation that the light source module 1000 lights a target object according to an embodiment of the invention. Referring to the right side of FIG. 13, the light source module 1000 of the embodiment includes a plurality of light source devices 100. The light source devices 100 are arranged like an array to form an optical unit 100A, where the structure of the light source device 100 could refer to the related descriptions of FIG. 3, which is not repeated herein. Moreover, as shown in FIG. 13, the light source module 1000 of the embodiment may further include a plurality of light source devices 100' disposed aside the optical unit 100A. The light source devices 100' are also arranged like an array to form an optical unit 100B, where a structure of the light source device 100' is similar to that of the light source device 100.

In the embodiment, since the optical unit 100A formed by the light source devices 100 and the optical unit 100B formed by the light source devices 100' are connected and respectively located on different planes. In other words, shown as the left side of FIG. 13, in the embodiment, the optical unit 100A and the optical unit 100B respectively light an upper portion 200b and a lower portion 200c of a target object 200' with a larger area in different angles. It should be noticed that structures of the light source devices 100 in the optical unit 100A and structures of the light source devices 100' in the optical unit 100B could be different. In other words, the structures of the light source devices 100 in the optical unit 100A and the structures of the light source devices 100' in the optical unit 100B could be suitably designed for respectively lighting the upper portion 200b and the lower portion 200c of the target object 200', so as to optimize an effect that the light source module 1000 lights the target object 200', and increase uniformity and illumination efficiency for the light source module 1000 lighting the target object 200'.

Figure 14:
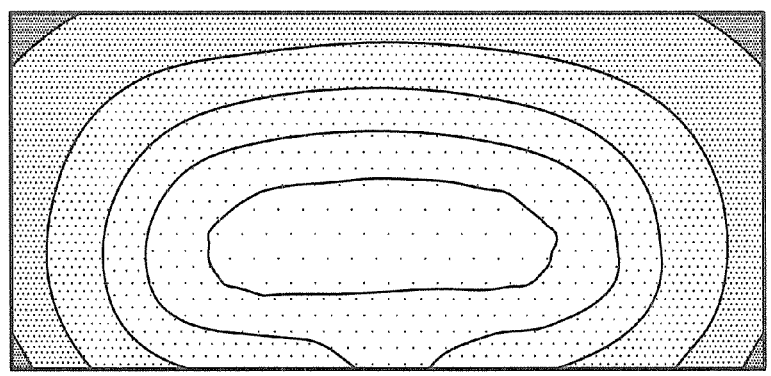
FIG. 14 is an illuminance isoline plot of a light source module according to an embodiment of the invention.

FIG. 14 is an illuminance isoline plot of the light source module 1000 of the invention. Referring to FIG. 14, it is known that a light shape of the light source module 1000 of the embodiment is close to a rectangle (i.e. close to an appearance of the target object 200') and is even.

In summary, the embodiment of the invention has at least one of the following advantages or effects. In the lens structure, the light source device and the light source module of the embodiment of the invention, by designing the second surface of the lens structure to be a free-form surface and suitably designing the first surface or the TIR surfaces, the light shape and the light intensity distribution of the lens structure, the light source device or the light source module could be adjusted to achieve a good illumination effect and light uniformity of the lens structure, the light source device and the light source module. Moreover, the shapes and configuration method of the TIR surfaces could also be suitably designed to adjust the light shape and light intensity distribution of the lens structure, the light source device or the light source module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source device, comprising:
   a light emitting device, capable of emitting a light beam; and
   a lens structure, comprising:
      a first surface, having a recess, wherein the light emitting device is disposed at the recess;
      a second surface, opposite to the first surface, and being a free-foam surface, wherein the light beam is capable of entering the lens structure through the first surface, and leaving the lens structure through the second surface; and
      four total internal reflection surfaces, connected to the second surface, and some of the total internal reflection surfaces connected to the first surface.

2. The light source device as claimed in claim 1, wherein the lens structure further comprises a bottom surface opposite to the second surface and connected to the total internal reflection surface and the first surface.

3. The light source device as claimed in claim 1, wherein the lens structure further has a reference plane, and the total internal reflection surfaces comprise a first total internal reflection surface and a second total internal reflection surface symmetric to the first total internal reflection surface about the reference plane.

4. The light source device as claimed in claim 3, wherein the total internal reflection surfaces comprise:
   a third total internal reflection surface, connected to the first total internal reflection surface and the second total internal reflection surface; and
   a fourth total internal reflection surface, opposite to the third total internal reflection surface, and connected to the first total internal reflection surface and the second total internal reflection surface, wherein a shortest distance between an optical axis of the light-emitting device and a join of the first surface and the third total internal reflection surface is different to a shortest distance between the optical axis of the light-emitting device and a join of the second surface and the fourth total internal reflection surface.

5. The light source device as claimed in claim 1, wherein the first surface is a concave surface, and the concave surface pits towards the second surface.

6. The light source device as claimed in claim 5, wherein the second surface is a convex surface, and the convex surface swells along a direction from the first surface to the second surface.

7. The light source device as claimed in claim 1, wherein the first surface is a free-form surface.

8. The light source device as claimed in claim 1, wherein the total internal reflection surfaces form a taper towards the first surface.

9. The light source device as claimed in claim 1, wherein at least one of the total internal reflection surfaces is one of a free-form surface, a spherical surface, an aspherical surface and a biconic surface.

10. A lens structure, capable of guiding a light beam, and the lens structure comprising:
    a first surface, having a recess;
    a second surface, opposite to the first surface, and being a free-form surface, wherein the light beam is capable of entering the lens structure through the first surface, and leaving the lens structure through the second surface; and
    four total internal reflection surfaces, connected to the second surface, and some of the total internal reflection surfaces connected to the first surface.

11. The lens structure as claimed in claim 10, further comprising a bottom surface opposite to the second surface and connected to the total internal reflection surface and the first surface.

12. The lens structure as claimed in claim 10, wherein the lens structure further has a reference plane, and the total internal reflection surfaces comprise a first total internal reflection surface and a second total internal reflection surface symmetric to the first total internal reflection surface about the reference plane.

13. The lens structure as claimed in claim 12, wherein the total internal reflection surfaces comprise:
    a third total internal reflection surface, connected to the first total internal reflection surface and the second total internal reflection surface; and
    a fourth total internal reflection surface, opposite to the third total internal reflection surface, and connected to the first total internal reflection surface and the second total internal reflection surface, wherein a shortest distance between a center of the recess and a join of the first surface and the third total internal reflection surface is different to a shortest distance between the center of the recess and a join of the second surface and the fourth total internal reflection surface.

14. The lens structure as claimed in claim 10, wherein the first surface is a concave surface, and the concave surface pits towards the second surface.

15. The lens structure as claimed in claim 14, wherein the second surface is a convex surface, and the convex surface swells along a direction from the first surface to the second surface.

16. The lens structure as claimed in claim 10, wherein the first surface is a free-form surface.

17. The lens structure as claimed in claim 10, wherein the total internal reflection surfaces form a taper towards the first surface.

18. The lens structure as claimed in claim 10, wherein at least one of the total internal reflection surfaces is one of a free-form surface, a spherical surface, an aspherical surface and a biconic surface.

19. A light source module, comprising:
    a plurality of first light source devices, arranged like an array, and each of the first light source devices comprising a first light-emitting device and a first lens structure, wherein the first light emitting device is capable of emitting a first light beam, and the first lens structure comprises:
       a first surface, having a first recess, wherein the first light emitting device is disposed at the first recess;
       a second surface, opposite to the first surface, and being a free-form surface, wherein the first light beam is capable of entering the first lens structure through the first surface, and leaving the first lens structure through the second surface; and
       four total internal reflection surfaces, connected to the second surface, and some of the total internal reflection surfaces connected to the first surface.

20. The light source module as claimed in claim 19, further comprising:
    a plurality of second light source devices, arranged like an array, and disposed aside the first light source devices, wherein each of the second light source devices comprises a second light emitting device and a second lens structure, the second light emitting device is capable of emitting a second light beam, and the second lens structure comprises:
       a third surface, having a second recess, wherein the second light emitting device is disposed at the second recess;
       a fourth surface, opposite to the third surface, and being a free-form surface, wherein the second light beam is capable of entering the second lens structure through the third surface, and leaving the second lens structure through the fourth surface; and
       four total internal reflection surfaces, connected to the fourth surface, and some of the total internal reflection surfaces connected to the third surface.

21. The light source module as claimed in claim 20, wherein the first light source devices and the second light sources devices are located on different planes.

22. The light source module as claimed in claim 19, wherein the first lens structure further comprises a bottom surface opposite to the second surface and connected to the total internal reflection surface and the first surface.

23. The light source module as claimed in claim 19, wherein the lens structure further has a reference plane, and the total internal reflection surfaces comprise a first total internal reflection surface and a second total internal reflection surface symmetric to the first total internal reflection surface about the reference plane.

24. The light source module as claimed in claim 23, wherein the total internal reflection surfaces comprise:
 a third total internal reflection surface, connected to the first total internal reflection surface and the second total internal reflection surface; and
 a fourth total internal reflection surface, opposite to the third total internal reflection surface, and connected to the first total internal reflection surface and the second total internal reflection surface, wherein a shortest distance between an optical axis of the first light emitting device and a join of the first surface and the third total internal reflection surface is different to a shortest distance between the optical axis of the first light emitting device and a join of the second surface and the fourth total internal reflection surface.

25. The light source module as claimed in claim 19, wherein the first surface is a concave surface, and the concave surface pits towards the second surface.

26. The light source module as claimed in claim 25, wherein the second surface is a convex surface, and the convex surface swells along a direction from the first surface to the second surface.

27. The light source module as claimed in claim 19, wherein the first surface is a free-form surface.

28. The light source module as claimed in claim 19, wherein the total internal reflection surfaces form a taper towards the first surface.

29. The light source module as claimed in claim 19, wherein at least one of the total internal reflection surfaces is one of a free-form surface, a spherical surface, an aspherical surface and a biconic surface.

* * * * *